(12) United States Patent
Wang et al.

(10) Patent No.: US 7,925,674 B2
(45) Date of Patent: Apr. 12, 2011

(54) MANAGEMENT OF A DISTRIBUTED DATABASE

(75) Inventors: Byron Wang, Mountain View, CA (US); Nimar Arora, Union City, CA (US); Lik Wong, Union City, CA (US); Jingwei Wu, Foster City, CA (US); Jun Yuan, Foster City, CA (US)

(73) Assignee: Oracle International Corp., Redwood Shores, CA (US)

( * ) Notice: Subject to any disclaimer, the term of this patent is extended or adjusted under 35 U.S.C. 154(b) by 257 days.

(21) Appl. No.: 11/604,529

(22) Filed: Nov. 27, 2006

(65) Prior Publication Data
US 2008/0126354 A1     May 29, 2008

(51) Int. Cl.
    G06F 7/00     (2006.01)
    G06F 17/30     (2006.01)
(52) U.S. Cl. .................. 707/802; 707/805; 707/966
(58) Field of Classification Search .................. None
See application file for complete search history.

(56) References Cited

U.S. PATENT DOCUMENTS

| | | | | |
|---|---|---|---|---|
| 6,985,944 | B2* | 1/2006 | Aggarwal | 709/224 |
| 2005/0091227 | A1* | 4/2005 | McCollum et al. | 707/100 |
| 2007/0271570 | A1* | 11/2007 | Brown et al. | 718/105 |
| 2008/0222202 | A1* | 9/2008 | Solomon | 707/104.1 |

OTHER PUBLICATIONS

Author: Oracle Title: Managing the Complete Oracle Environment with Oracle Enterprise Manager 10g Date: Jan. 2004 Publisher: Oracle Pertinent Pages: whole document (pp. 1-53).*
Author: Oracle Title: Oracle Enterprise Manager Date: Oct. 2005 Publisher: Oracle Edition: 10g Release 2 Pertinent pp. 1-214.*
Author: Oracle; Title: Oracle 9i Database Administrator Guide;Date:Mar. 2002; Edition: 2 (9.2); Pertinent pp. 1-80 (renumbered).*
Author: Oracle; Title: Oracle Enterprise Manager—Administrator Guide; Date: Mar. 2002; Edition: 9.2.0; Pertinent pp. 1-49 (renumbered).*
Oracle Corporation, Managing the Complete Oracle Environment with Oracle Enterprise Manager 10g, Oracle Enterprise Manager, Jan. 2006, pp. 1-9, Oracle Corp., Redwood Shores, CA, US.

* cited by examiner

*Primary Examiner* — Jay A Morrison
*Assistant Examiner* — Anh Tai V Tran
(74) *Attorney, Agent, or Firm* — Kraguljac & Kalnay, LLC (57) ABSTRACT

Systems, methodologies, media, and other embodiments associated with managing of a distributed database are described. One exemplary system embodiment includes an input logic configured to obtain information associated with a distributed database where the distributed database comprises a plurality of databases. An analysis logic analyzes the information obtained from the distributed database to determine performance information associated with the distributed database and, an output logic can provide information regarding the performance information associated with the distributed database.

21 Claims, 6 Drawing Sheets

MANAGEMENT OF A DISTRIBUTED DATABASE

BACKGROUND

A distributed database can be flexible, allowing routing of database changes and/or user message(s) between an arbitrary number of databases. Additionally, changes can be routed uni-directionally and bi-directionally, and allow user code to be run in multiple locations. However, configuration of a distributed database can be a time-consuming and frustrating experience. For example, users can encounter configuration issues in which a particular configuration of a distributed database does not behave as expected (e.g., without an error being raised).

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Example systems, methods, computer-readable media, software and other embodiments are described herein that relate to distributed database management. In one embodiment, a distributed database management system can obtain information associated with a distributed database, analyze the information to determine performance information, and, provide the performance information as an output.

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer-readable medium", as used herein, refers to a medium that stores instructions and/or data. A computer-readable medium may take forms, including, but not limited to, non-volatile media and volatile media. Non-volatile media may include, for example, optical or magnetic disks and so on. Volatile media may include, for example, semiconductor memories, dynamic memory and the like. Common forms of a computer-readable medium include, but are not limited to, a floppy disk, a flexible disk, a hard disk, a magnetic tape, a CD-ROM, a RAM, a ROM, an EPROM, a FLASH-EPROM, or other memory chip or card, a memory stick, and other media from which a computer, a processor or other electronic device can read.

"Logic", as used herein, includes but is not limited to hardware, firmware, software embodied as computer executable instructions stored on a computer-readable medium and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software embodied as computer executable instructions stored on a computer-readable medium. Where multiple logical logics are described, it may be possible to incorporate the multiple logical logics into one physical logic. Similarly, where a single logical logic is described, it may be possible to distribute that single logical logic between multiple physical logics.

"Query", as used herein, refers to a semantic construction that facilitates gathering and processing information. A query might be formulated in a database query language like structured query language (SQL) or object query language (OQL). A query might be implemented in computer code (e.g., C#, C++, Javascript) that can be employed to gather information from various data stores and/or information sources.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions stored on a computer-readable medium that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, is embodied as an article of manufacture and maintained or provided as part of a computer-readable medium as defined previously. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

Conventionally, a user of a single database has been able to obtain performance statistics regarding the database using analytical tools. However, such performance statistics have not been available for the distributed database environment.

Figure 1:
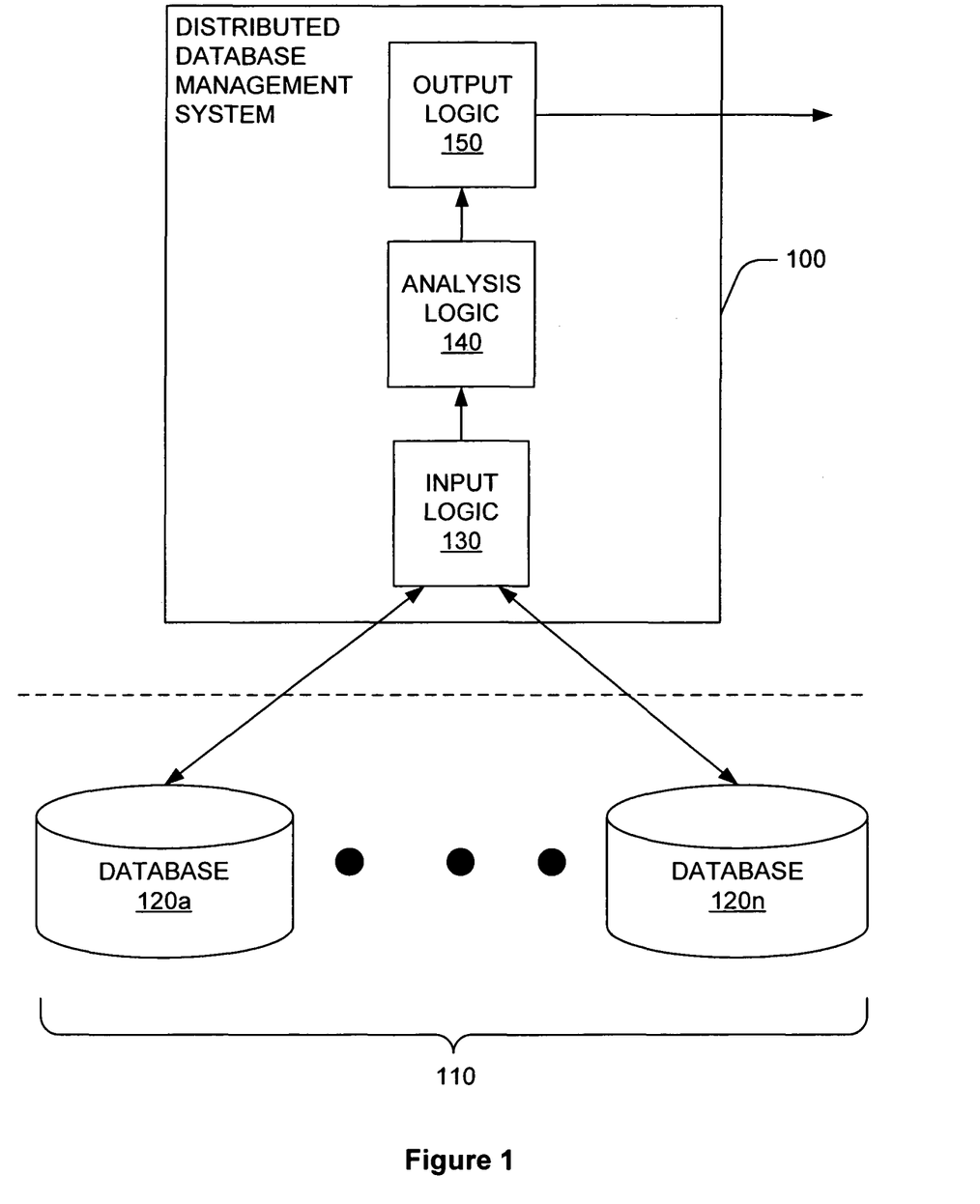
FIG. 1 illustrates an example distributed database management system.

FIG. 1 illustrates a distributed database management system 100 that can be employed to manage a distributed database 110. Generally, a distributed database comprises a set of databases (e.g. 120a-120n), each stored on different storage mechanisms, that appears to applications as a single database. Consequently, an application can simultaneously access and modify the data in several databases 120a-120n in a network. Each database 120a-120n in the distributed database 110 is controlled by its local database management server (DBMS) but cooperates to maintain the consistency of the global distributed database 110.

The distributed database management system 100 can obtain information associated with individual databases 120a-120n of the distributed database 110. The distributed database management system 100 can then analyze the information received from the databases 120a-120n and provide the result(s) of the analysis as an output, for example, to a user.

Accordingly, the distributed database management system 100 can aggregate database statistics from the plurality of databases 120a-120n. The distributed database management system 100 can then analyze the aggregated data to identify performance and/or configuration issue(s), if any.

The distributed database management system 100 includes an input logic 130 configured to receive information associated with the distributed database 110. In one embodiment, the input logic 130 gathers information from each of the databases 120a-120n of the distributed database 110. For example, the input logic 130 can query the databases 120a-120n periodically (e.g., every five minutes) and/or on-demand (e.g., in response to a request to perform analysis from a user).

In another example, the databases 120a-120n can move data via export/import (e.g., periodically) to the input logic 130. In yet another example, the input logic 130 can receive information from a user manually by populating data provided by statistics-gathering software associated with one or more of the databases 120a-120n.

The distributed database management system 100 further includes an analysis logic 140 configured to analyze the information received from the distributed database 110 to determine performance information associated with the distributed database 110. In one example, the analysis logic 140 can determine throughput (e.g., in terms of messages per second) and latency. Latency is a measurement of how far behind one database 120a is from another database 120n. The analysis logic 140 can also identify individual component(s) with limited capacity that negatively impact the distributed database 110 (e.g., bottleneck(s)).

The analysis logic 140 can further provide recommendation(s) on reducing the impact and/or eliminating the identified bottleneck(s) (e.g., configuration of the distributed database 110 and/or individual database(s) 120a-120n). Thus, the analysis logic 140 can identify configuration issue(s), performance issue(s) and/or runtime error(s) and, optionally, provide recovery suggestions.

For example, the analysis logic 140 can employ an alert infrastructure. In this example, an alert is a message signaled by a particular database 120a that something is critically wrong and requires user intervention (for example a component aborts). This can be the trigger that starts the analysis logic 140 to determine why the alert was raised and how to recover. The output logic 150 can be aware of the alert(s), for example, a flag could appear in the graphical user interface (GUI), a section in the text-file and/or a row in an output view.

In one example, the analysis logic 140 can temporarily store the information received in a rolling buffer and/or persistently maintain the information (e.g., for historical trending, archival, etc.).

Optionally, the analysis logic 140 can perform analysis with respect to configuration of the distributed database 110 (e.g., topology), error detection and/or tracing, as discussed in greater detail below.

The distributed database management system 100 further includes an output logic 150 configured to provide information regarding the performance information associated with the distributed database 110. In one embodiment, at least a portion of the performance information is available to a user via a graphical user interface (e.g., display).

In one example, the output logic 150 provides analysis results via a web-based user interface that depicts the distributed database topology (e.g., on a display screen), flagging database(s) 120a-120n, if any, that require attention. Additionally and/or alternatively, a database-centric screen can illustrate incoming and/or outgoing flows of data from a particular database 120a-120n. Another screen can be provided that identifies streams of data that can be used to monitor performance and/or overall system health as well as identify performance bottlenecks.

In one example, the output logic 150 includes application program interface(s) (APIs) that can be employed to publish the results (e.g., via database views). APIs can further be provided by the distributed data base management system 100 to trigger the information gathering of the input logic 130 and/or analysis by the analysis logic 140.

In another example, for file-based users, the output logic 150 can generate a text-based analysis summary.

Figure 2:
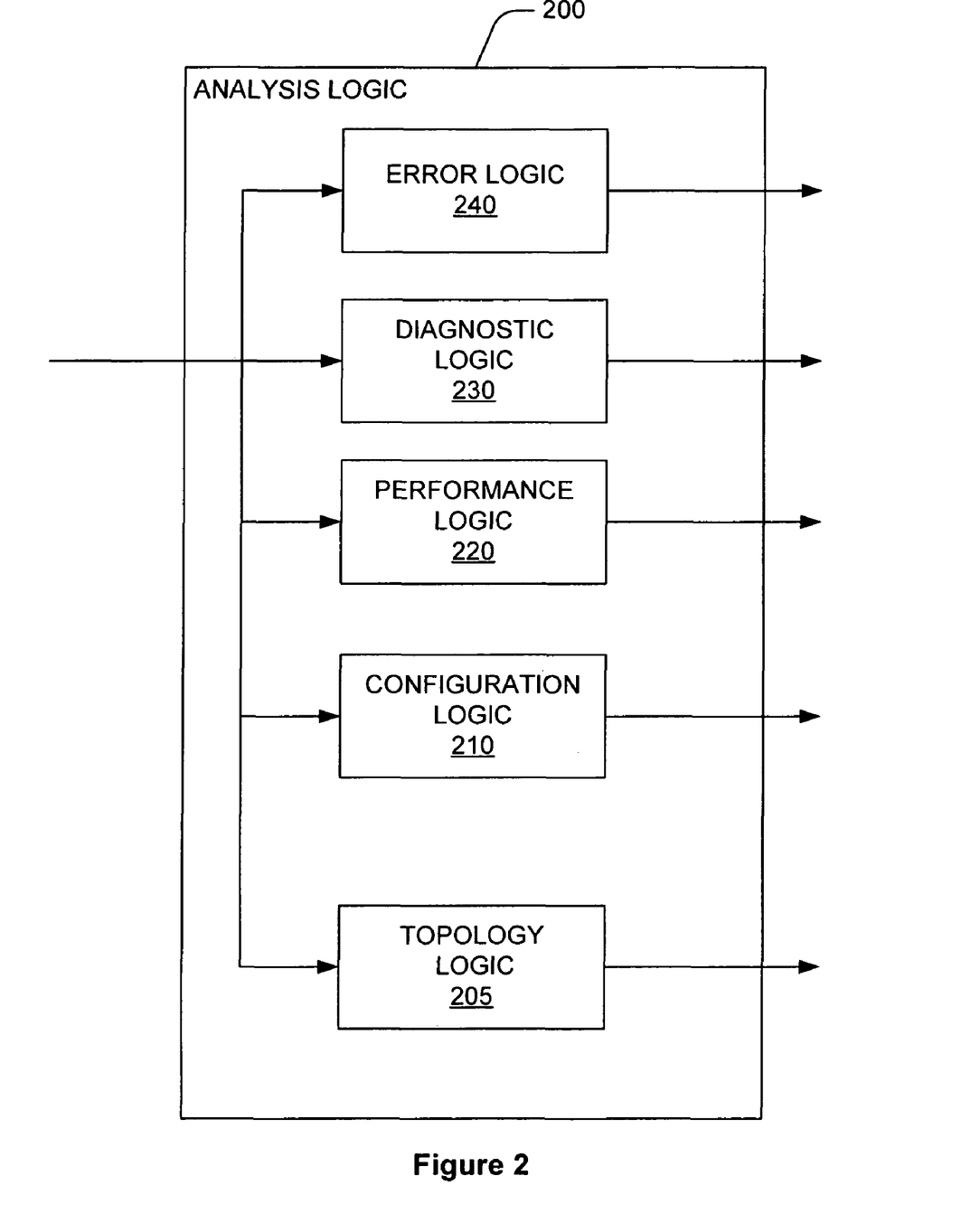
FIG. 2 illustrates an example analysis logic.

FIG. 2 illustrates an analysis logic 200 (e.g., analysis logic 140) that can be employed in a distributed database management system (e.g., distributed database management system 100 shown in FIG. 1). The analysis logic 200 receives information received from a distributed database (e.g., distributed database 110 shown in FIG. 1), for example, via an input logic 130. The analysis logic 200 includes a topology logic 205, configuration logic 210, a performance logic 220, a diagnostic logic 230 and/or an error logic 240.

The configuration of distributed databases can be problematic. Distributed databases offer flexibility, for example, by allowing the routing of database changes and/or user messages between an arbitrary number of databases, allowing the changes to be routed uni-directionally and bi-directionally, and allowing user code to be run in multiple locations. Configuration issues arise when a particular distributed database configuration does not behave as expected, often without an error being raised. For example, overlapping rules may lead to user code being executed non-deterministically.

The topology logic 205 is configured to determine a topology of the distributed database. In one example, the distributed database includes components (e.g., capture components, queue components, propagation sender components, propagation receiver components and apply components) along with component links which link the various components. Thus, in one example, topology information can be presented in two views per database, a component view and a component link view.

In this example, the topology logic 205 can identify each of the components (e.g., by component name), along with a type of component and an associated database to which the component belongs. An exemplary component view is:

| Component Name | Component Type | Database |
| --- | --- | --- |
| Cap | Capture | DBS1 |
| Queue1 | Queue | DBS1 |
| PropS | Propagation Sender | DBS1 |
| PropR | Propagation Receiver | DBS2 |

Additionally, the topology logic 205 can identify component link(s) between the identified components, for example:

| Source Component | Destination Component |
| --- | --- |
| Cap, DBS1 | Queue1, DBS1 |
| Queue1, DBS1 | PropS, DBS1 |
| PropS, DBS1 | PropR, DBS2 |

While a single publisher-subscriber scenario is described herein, those skilled in the art will recognize that the topology logic 205 can be employed to identify multiple publisher and/or multiple subscriber scenarios.

Once the components and component links have been identified, the topology logic 205 can aggregate the components and component links into a topology of the distributed database. The topology logic 205 can provide information related to the components, the component links and/or the topology, for example, to an output logic 150 for presentation to a user and/or the configuration logic 210 to determine which component(s) to check.

In one embodiment, a user is presented with a graphical user interface representing the topology of the distributed database with each database and link identified. Using a pointing device, a user can navigate the topology to ascertain component and/or component link information.

In one example, the configuration logic 210 can further detect common misconfiguration(s) of the distributed database and, optionally, recommend a correct configuration. Optionally, the configuration logic 210 can further check adherence to best-practices of distributed database configuration.

The analysis logic 200 can further include performance logic 220 configured to measure the performance of the distributed database, component(s) and/or component link(s) of the distributed database.

In one example, the performance logic 220 employs a topology determined by the topology logic 205. The performance logic 220 can report throughput and latency measurements for the topology and determine bottleneck(s), if any, of the topology. In one example, the bottleneck component(s) are identified and the topology paths are obtained as follows. First, the topology logic 205 determines the flow or "path" of data. Each path includes a group of components linked together, as discussed above, with data being sent from component to component along the path. For any group of databases there may be multiple paths. Paths are uni-directional, having a starting and ending component (which may be on the same database). In this example, unique paths are identified by designating an 'ending component', and backtracking until a 'starting component' is found. In this manner, every component traversed in this 'depth first search' order is considered to be on the path. There are cases where a single component can be on multiple paths, which can be accounted for.

Once the paths are discovered, the bottleneck component can be obtained by the performance logic 220 by analyzing the wait event information of each component, along with CPU consumption and network bandwidth (between databases).

The performance logic 220 can further examine component(s) and provide information regarding recommendation (s) to increase the throughput of component(s).

The analysis logic 200 can also include a diagnostic logic 230 configured to diagnose a health status of the distributed database and/or individual database(s). For example, the diagnostic logic 230 can employ health checks to proactively monitor the health of the distributed database and/or detect errors.

In one example, the diagnostic logic 230 can provide dictionary health checks and/or component checks. The dictionary health check can check the integrity of core metadata tables, reporting inconsistencies and/or recommending behavior to correct the inconsistencies.

The diagnostic logic 230 can further employ a unified tracing service (UTS) which can provide a common API to write records to memory and/or disk (e.g., structured trace and/or in-memory buckets). The unified tracing service can be employed to allow a viewer to parse trace files and present trace data with navigation capability. The view can also show a list of object identifiers (object ids) to choose from when navigating trace files. For unified tracing, the diagnostic logic 230 can pull trace records from databases (e.g., databases 120a-120n), then analyze them as a group and/or present them to the user as a group. This analysis can be useful since in a distributed database environment often as chronological information can be advantageous. The diagnostic logic 230 can mitigate the need to manually sort trace records (e.g., based on date).

With respect to structured trace, for trace records associated with LCRs (Logical Change Records), an LCR namespace for the object identifier (object_id) can be created, for example, with the identifier being the table that the change is for. Attributes can further be defined that can assist the viewer to filter the trace data.

In one example, trace data can further be organized in sections—trace records that mark the beginning or end of a logic group of trace records. In this example, sections can be nested, thus allowing a view the ability to "drill-down" based on sections, allowing sections to be hidden or expanded.

As noted above, the diagnostic logic 230 can employ in-memory bucket(s) (e.g., circular buffer(s)) that can be employed to maintain specific trace records in memory. For example, should a process die or an error be signaled, these trace records can be dumped and analyzed.

In one example, the diagnostic logic 230 includes an history bucket which stores information regarding significant state transitions and non-typical events that occur in the execution of a particular process (e.g., flow control, entry entered/removed in XID hash table and/or LOB hash table, checkpoint missed and the like).

In one embodiment, the diagnostic logic 230 includes a work bucket that stores trace records for a current operation. Accordingly, upon determination of an error, the diagnostic logic 230 can examine the work bucket to determine what each process was executing prior to the error (e.g., not simply the function stack that lead to the error).

Optionally, the diagnostic logic 230 can provide for message tracking in which LCRs generated by a user's session (e.g., either explicitly created and/or through DMLs) are marked, for example, until the session ends and/or the mark is removed. The LCR markings can be employed by the diagnostic logic 230 to determine what happened to LCRs with respect to one or more of the databases of the distributed database.

Once an error and/or misconfiguration is detected, the analysis logic 200 can provide tools to help diagnose the root cause of the unexpected behavior. For example, if data is now flowing correctly from one database to another, the analysis logic 200 can provide a means of tracking individual units of data as they flow through the distributed database.

The analysis logic 200 can further include an error logic 240 configured to analyze aborted component(s) and to provide recommendation(s) with respect to recovery from error (s) (e.g., non-critical user error(s)). The error(s) can occur, for example, when configuring the distributed database and/or when applying database changes.

In one example, the error logic 240 can analyze capture, propagation and/or apply process(es) that have aborted and suggest how to recover, pulling data from multiple databases, if necessary.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

Figure 3:
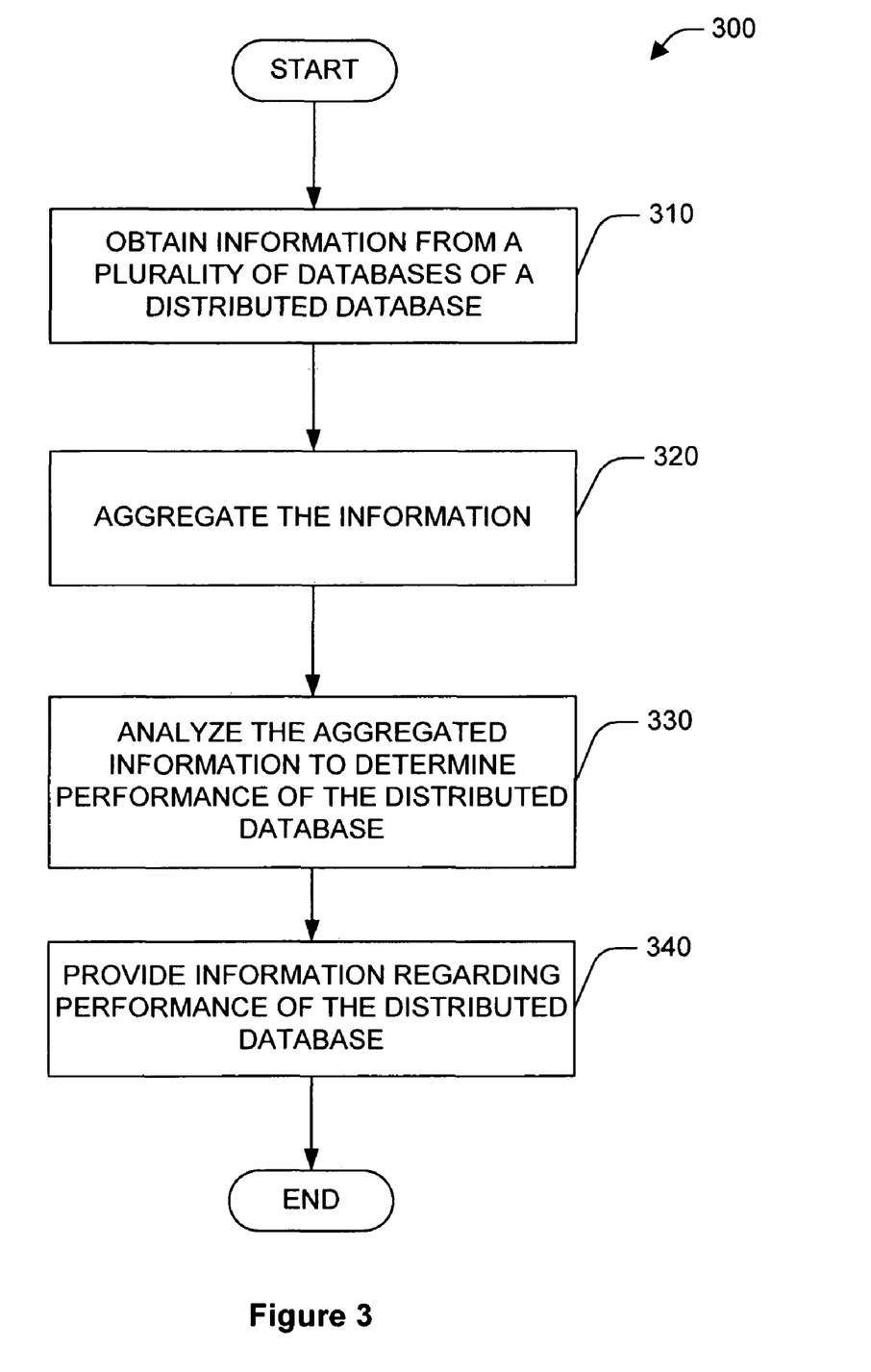
FIG. 3 illustrates an example method for managing a distributed database.

Illustrated in FIG. 3 is an example methodology 300 that can be associated with management of a distributed database. The illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methodologies can be implemented as processor executable instructions and/or operations provided by a computer-readable medium. In another example, the processing blocks may represent functions and/or actions performed by functionally equivalent circuits such as an analog circuit, a digital signal processor circuit, an application specific integrated circuit (ASIC), or other logic device. The diagram of FIG. 3, as well as the other illustrated diagrams, are not intended to limit the implementation of the described examples. Rather, the diagrams illustrate functional information one skilled in the art could use to design/fabricate circuits, generate software, or use a combination of hardware and software to perform the illustrated processing.

It will be appreciated that electronic and software applications may involve dynamic and flexible processes such that the illustrated blocks can be performed in other sequences different than the one shown and/or blocks may be combined or separated into multiple components. Blocks may also be performed concurrently, substantially in parallel, and/or at substantially different points in time. They may also be implemented using various programming approaches such as machine language, procedural, object oriented and/or artificial intelligence techniques. The foregoing applies to all methodologies described herein.

FIG. 3 illustrates a method 300 for managing a distributed database. At 310, information is obtained from a plurality of databases of a distributed database. In one example, the information is obtained by querying the databases. In another example, the information is provided periodically by the databases.

At 320, the information obtained from the databases is aggregated. At 330, the aggregated information is analyzed to determine performance of the distributed database. At 340, information regarding performance of the distributed database is provided (e.g., as an output).

While FIG. 3 illustrates various actions occurring in serial, it is to be appreciated that various actions illustrated in FIG. 3 could occur substantially in parallel. By way of illustration, a first process could obtained information from the databases. Similarly, a second process could aggregate the information, while a third process could analyze the information. While three processes are described, it is to be appreciated that a greater and/or lesser number of processes could be employed and that lightweight processes, regular processes, threads, and other approaches could be employed.

Figure 4:
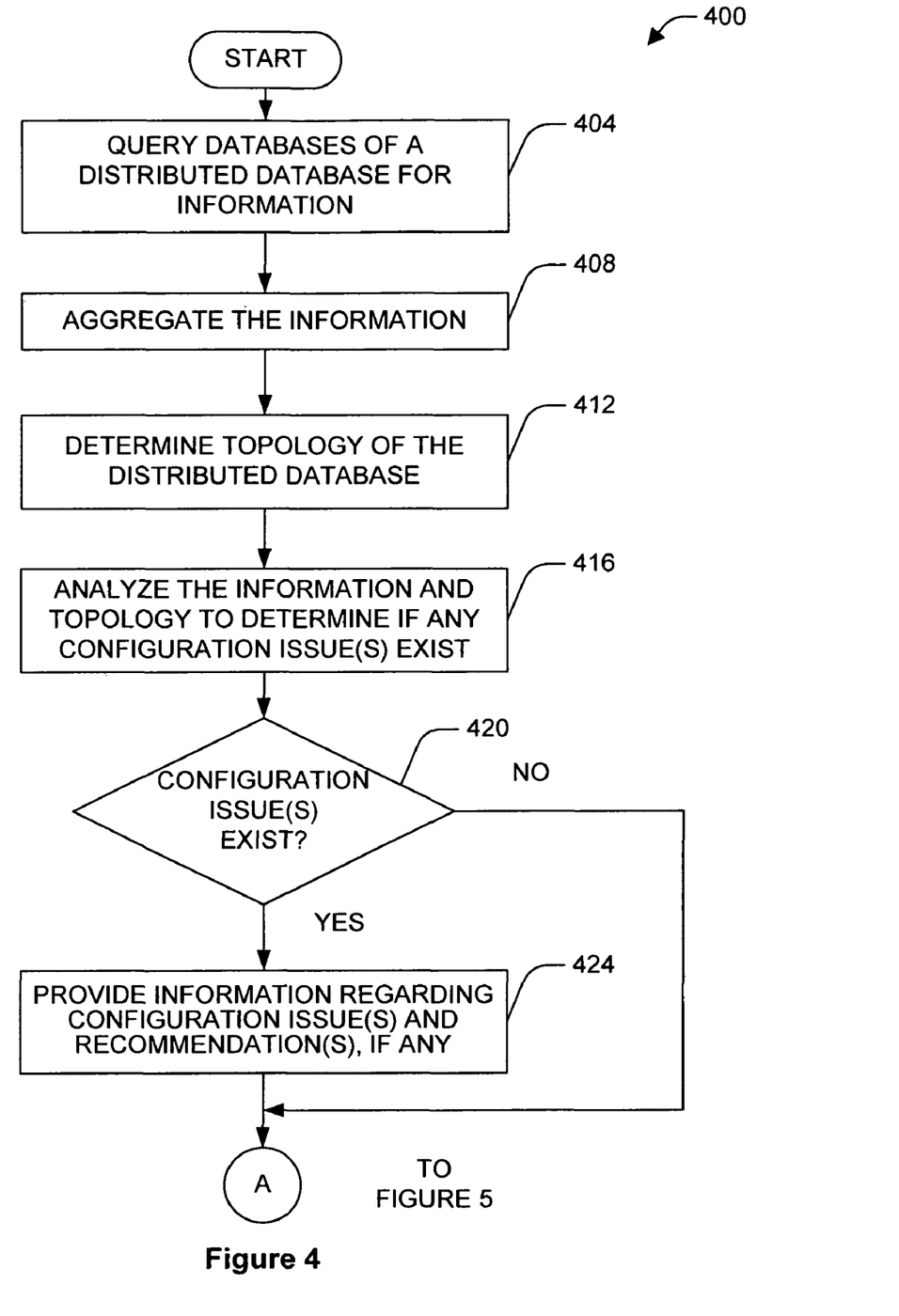
FIG. 4 illustrates an example method for managing a distributed database.
Figure 5:
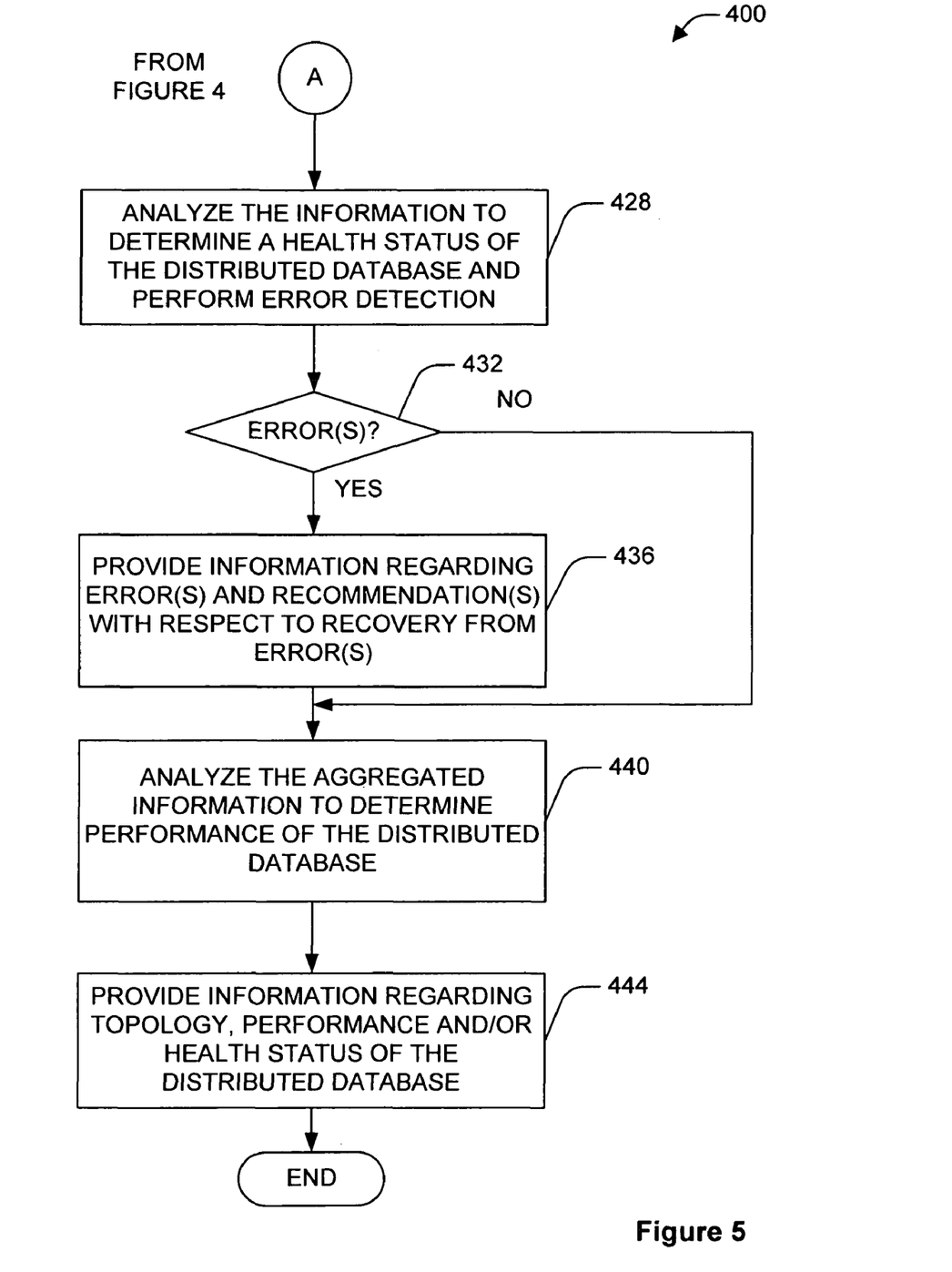
FIG. 5 further illustrates the method of FIG. 4.

FIGS. 4 and 5 illustrates a method 400 for managing a distributed database. At 404, databases of a distributed database are queried for information. At 408, the information is aggregated. At 412, a topology of the distributed database is determined based on the information received from the databases.

At 416, the information received from the databases and the topology are analyzed to determine if any configuration issue(s) exist. At 420, a determination is made as to whether any configuration issue(s) exist. If the determination at 420 is YES, at 424, information regarding configuration issues and recommendation(s), if any, is provided (e.g., output to a user) and the method 400 continues at 428. If the determination at 420 is NO, the method 400 continues at 428.

At 428, the information is analyzed to determine a health status of the distributed database and error detection is performed. At 432, a determination is made as to whether any error(s) have been detected. If the determination at 432 is YES, at 436, information regarding error(s) and recommendation(s) with respect to recovery from the error(s) is provided and the method 400 continues at 440. If the determination at 432 is NO, the method 400 continues at 440.

At 440, the aggregated information is analyzed to determine performance of the distributed database. At 444, information regarding the topology, performance and/or health status of the distributed database is provided (e.g., output to a user) and the method 400 ends.

While FIGS. 4 and 5 illustrate various actions occurring in serial, it is to be appreciated that various actions illustrated in FIGS. 4 and 5 could occur substantially in parallel. By way of illustration, a first process could query the databases, a second process could determine a topology of the distributed database, a third process could analyze the information and topology to determine if any configuration issue(s) exist, a fourth process could analyze the information to determine a health status of the distributed database, and a fifth process could analyze aggregated information to determine performance of the distributed database. While five processes are described, it is to be appreciated that a greater and/or lesser number of processes could be employed and that lightweight processes, regular processes, threads, and other approaches could be employed.

In one example, a method may be implemented as processor executable instructions. Thus, in one example, a machine-readable medium may store processor executable instructions that if executed by a machine (e.g., processor) cause the machine to perform method 400. While method 400 is described being stored on a machine-readable medium, it is to be appreciated that other example methods described herein (e.g., 300, 400) and/or combinations thereof may also be stored on a machine-readable medium.

Figure 6:
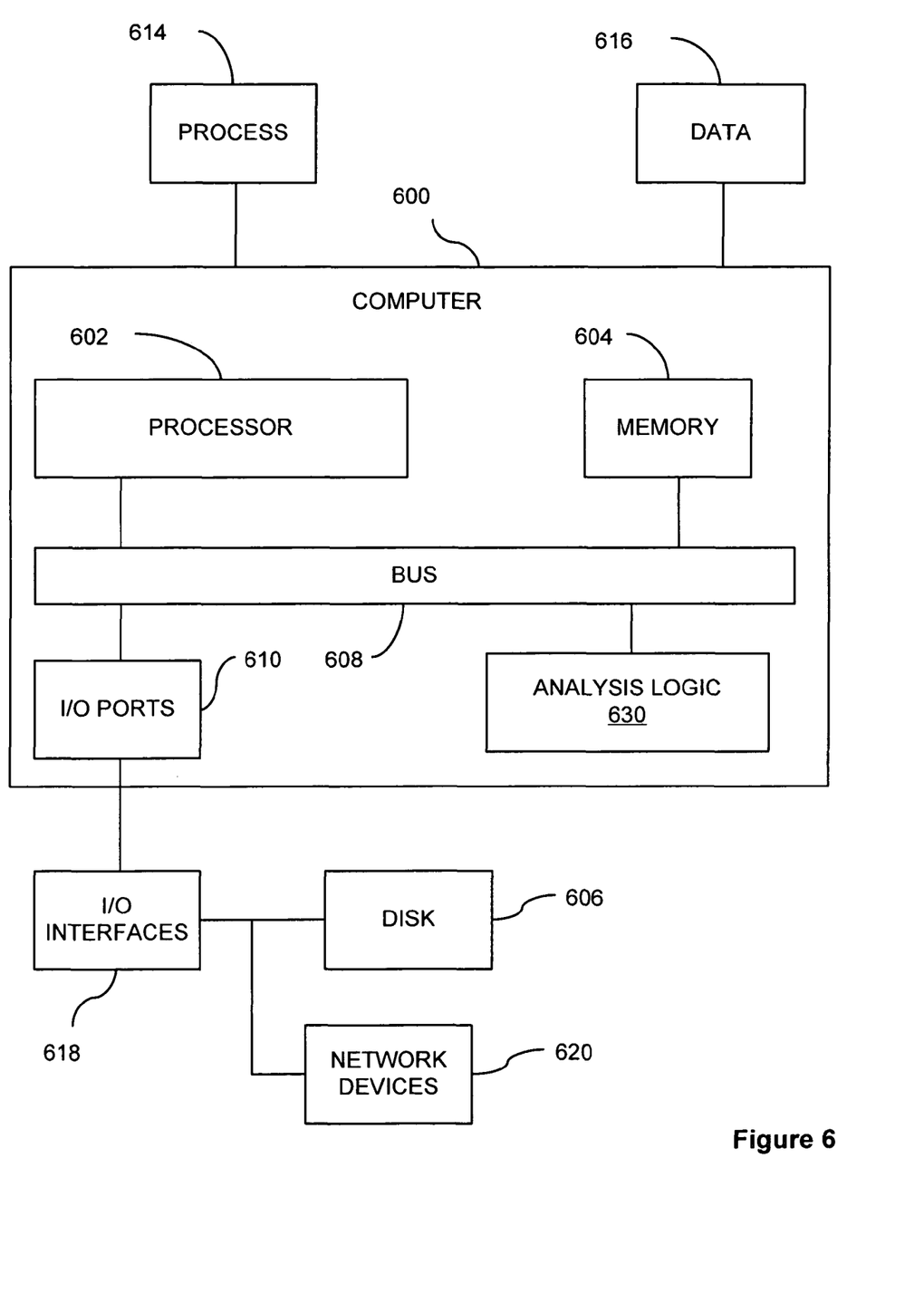
FIG. 6 illustrates an example computing environment in which example systems and methods illustrated herein can operate.

FIG. 6 illustrates an example computing device in which example systems and methods described herein, and equivalents, can operate. The example computing device may be a computer 600 that includes a processor 602, a memory 604, and input/output ports 610 operably connected by a bus 608. In one example, the computer 600 may include an analysis logic 630 configured to analyze information received from a distributed database to determine performance information associated with the distributed database. The analysis logic can be implemented similar to the analysis logic 140, 200 described in FIGS. 1 and 2, respectively, and/or the other systems and methods described herein.

Generally describing an example configuration of the computer 600, the processor 602 can be a variety of various processors including dual microprocessor and other multiprocessor architectures. The memory 604 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the computer 600 via, for example, an input/output interface (e.g., card, device) 618 and an input/output port 610. The disk 606 can include, but is not limited to, devices like a magnetic disk drive, a solid state disk drive, a floppy disk drive, a tape drive, a Zip drive, a flash memory card, and/or a memory stick. Furthermore, the disk 606 can include optical drives like a CD-ROM, a CD recordable drive (CD-R drive), a CD rewriteable drive (CD-RW drive), and/or a digital video ROM drive (DVD ROM). The memory 604 can store processes 614 and/or data 616, for example. The disk 606 and/or memory 604 can store an operating system that controls and allocates resources of the computer 600.

The bus 608 can be a single internal bus interconnect architecture and/or other bus or mesh architectures. While a single bus is illustrated, it is to be appreciated that computer 600 may communicate with various devices, logics, and peripherals using other busses that are not illustrated (e.g., PCIE, SATA, Infiniband, 1394, USB, Ethernet). The bus 608 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 600 may interact with input/output devices via i/o interfaces 618 and input/output ports 610. Input/output devices can include, but are not limited to, a keyboard, a microphone, a pointing and selection device, cameras, video cards, displays, disk 606, network devices 620, and the like. The input/output ports 610 can include but are not limited to, serial ports, parallel ports, and USB ports.

The computer 600 can operate in a network environment and thus may be connected to network devices 620 via the i/o devices 618, and/or the i/o ports 610. Through the network devices 620, the computer 600 may interact with a network. Through the network, the computer 600 may be logically connected to remote computers. The networks with which the computer 600 may interact include, but are not limited to, a local area network (LAN), a wide area network (WAN), and other networks. The network devices 620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 620 can connect to WAN technologies including, but not limited to, point to point links, circuit switching networks like integrated services digital networks (ISDN), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A distributed database management system comprising:
   means for identifying a database component in a distributed database at which a flow of data terminates, the distributed database comprising a plurality of database components being stored on different hardware memory devices and together creating the distributed database, that appears to applications as a single database;
   means for determining one or more topology paths between database components in a distributed database and links between the database components paths by identifying a destination component at which a flow of data terminates, traversing database component links from the destination component toward a source component from which the flow of data originates, and including one or more database components that are traversed as part of the one or more identified topology paths;
   means for traversing database component links between database components from the identified database component toward an originating database component from which the flow of data was started;
   means for including one or more database components and links that are traversed as part of one or more identified topology paths where at least one topology path traverses components and component links associated with databases stored on at least two different storage mechanisms;
   means for obtaining performance data collected by for individual database components in the one or more identified topology paths;
   means for aggregating the database components, performance-related information associated with the database components, and database component links to form a topology of the distributed database that includes performance information for individual database components in the distributed database
   means for identifying one or more database components as bottleneck components based, at least in part, on the performance data; and
   means for providing a visual representation of the one or more identified topology paths based, at least in part, on the performance data for one or more database components.

2. A distributed database management system, comprising:
   a hardware processor;
   an input logic to separately access plurality of database components in a distributed database to obtain performance-related information collected by the database components, the plurality of database components being stored on different hardware memory devices and together creating the distributed database that appears to applications as a single database;
   a performance logic to identify one or more database topology paths by identifying a destination component at which a flow of data terminates, traversing database component links from the destination component toward a source component from which the flow of data was started, and including one or more database components that are traversed as part of the one or more identified topology paths, and where the performance logic is configured to analyze the flow of data along the one or more identified topology paths and provide information related to the flow of data along the one or more identified topology paths;
   a topology logic that traverses data paths between database components and identifies database components on the traversed data paths by identifying a flow of data, identifying the source component, and identifying the destination component to determine a topology of the distributed database that includes the identified database components and database component links between the database components on the one or more identified topology paths, the topology logic aggregating the database components, performance-related information associated with the database components, and database component links to form a topology of the distributed database that includes performance information for individual database components in the distributed database; and
   an output logic to provide a visual representation of the determined topology.

3. The distributed database management system of claim 2, comprising a bottleneck logic that identifies one or more database components on the topology path that are creating a bottleneck to data flow.

4. The distributed database management system of claim 2, where the bottleneck logic identifies the database components that are creating a bottleneck by comparing wait times for the database components in the topology path.

5. The distributed database management system of claim 2, where the bottleneck logic identifies the database components that are creating a bottleneck by comparing CPU consumption of the database components in the topology path.

6. The distributed database management system of claim 2, where the bottleneck logic identifies the database components that are creating a bottleneck by comparing network bandwidth between the database components in the topology path.

7. The distributed database management system of claim 2, comprising a diagnostic logic that records trace information that tracks the flow of data along database component links and where the output logic provides a navigable visual representation of the trace information.

8. The distributed database management system of claim 7, where the diagnostic logic stores selected trace information related to non-typical database events.

9. The distributed database management system of claim 7, where the diagnostic logic stores selected trace information related to current database system operations.

10. The distributed database management system of claim 7, where the diagnostic logic marks selected data for tracking as the selected data flows through the distributed database system.

11. A non-transitory computer-readable storage medium having stored thereon computer-executable instructions that when executed by a machine cause the machine to perform a method, the method comprising:
- determining one or more topology paths between database components in a distributed database and links between the database components paths by identifying a destination component at which a flow of data terminates, traversing database component links from the destination component toward a source component from which the flow of data originates, and including one or more database components that are traversed as part of the one or more identified topology paths, the distributed database comprising a plurality of database components being stored on different memory devices and together creating the distributed database, to applications as a single database;
- obtaining performance data for individual database components in the one or more topology paths by separately accessing the database components to obtain performance-related information collected by the database components;
- analyzing the flow of data along the identified topology paths to provide information related to the flow of data along the one or more identified topology paths;
- aggregating the database components, performance-related information associated with the database components, and database component between the database components on the one or more identified topology paths to form a topology of the distributed database that includes performance information for individual database components in the distributed database; and
- identifying one or more database components as bottleneck components based, at least in part, on the performance data.

12. The computer-readable medium of claim 11, where the obtaining is performed by comparing wait times for the database components in the topology path.

13. The computer-readable medium of claim 11, where the obtaining is performed by comparing CPU consumption for the database components in the topology path.

14. The computer-readable medium of claim 11, where the obtaining is performed by comparing network bandwidth for the database components in the topology path.

15. The computer-readable medium of claim 11, comprising recording trace information that tracks the flow of data between database components and providing a navigable visual representation of the trace information.

16. The computer-readable medium of claim 11, comprising storing selected trace information related to non-typical database events.

17. The computer-readable medium of claim 11, comprising storing selected trace information related to current database system operations.

18. The computer-readable medium of claim 11, comprising marking selected data for tracking as the selected data flows through the distributed database system.

19. A method comprising:
- determining one or more topology paths between database components in a distributed database and links between the database components by identifying a destination component at which a flow of data terminates, traversing database component links from the destination component toward a source component from which the flow of data originates, and including one or more database components that are traversed as part of the one or more identified topology paths, the distributed database comprising a plurality of database components being stored on different memory devices and together creating the distributed database, that appears to applications as a single database;
- obtaining performance data for individual database components in the one or more topology paths by separately accessing the database components to obtain performance-related information collected by the database components;
- analyzing the flow of data along the identified topology paths to provide information related to the flow of data along the one or more identified topology paths;
- aggregating the database components, performance-related information associated with the database components, and database component links to form a topology of the distributed database that includes performance information for individual database components in the distributed database; and
- identifying one or more database components as bottleneck components based, at least in part, on the performance data.

20. The method of claim 19, where the obtaining is performed by comparing wait times for the database components in the topology path, CPU consumption for the database components in the topology path, or network bandwidth for the database components in the topology path.

21. The method of claim 19, comprising marking selected data for tracking as the selected data flows through the distributed database system.

* * * * *